United States Patent [19]

Kirk

[11] 3,755,785

[45] Aug. 28, 1973

[54] MULTIPLEXER

[75] Inventor: Robert T. Kirk, Ogden, Utah

[73] Assignee: Eaton Corporation, Cleveland, Ohio

[22] Filed: Mar. 6, 1972

[21] Appl. No.: 232,032

[52] U.S. Cl. .......... 340/172.5

[51] Int. Cl. .......... G06f 3/04

[58] Field of Search .......... 340/172.5; 179/15 A, 179/2 DP, 2 CA

[56] References Cited

UNITED STATES PATENTS

| | | | |
|---|---|---|---|
| 3,599,160 | 8/1971 | Nestle | 340/172.5 |
| 3,626,382 | 12/1971 | Pedersen | 340/172.5 |

*Primary Examiner*—Ralph D. Blakeslee

*Attorney*—Lynn G. Foster

[57] ABSTRACT

A multiplexer for interfacing between a computer and a plurality of transceivers, said multiplexer comprising an input gate connected to receive data from said computer and from said transceivers, a pair of registers connected to receive data passed by said input gate, output gate means operable to pass signals from said registers to either said computer or said transceivers, check sum means for generating check sum characters for data passed by said input gate, comparator means for comparing the check sum generated by said check sum means with a transmitted check sum, decoder means connected to detect end-of-transmission signals passed by said input gate, and a control unit for controlling the operation of said multiplexer.

7 Claims, 3 Drawing Figures

PATENTED AUG 28 1973

3,755,785

SHEET 2 OF 3

PATENTED AUG 28 1973

3,755,785

SHEET 3 OF 3

MULTIPLEXER

BACKGROUND

1. Field of Invention

This invention relates to automatic control systems and is particularly directed to multiplexer controllers for use in computer supervised automatic control systems.

In automatic control systems, it is frequently necessary to provide two-way communication between the control source and one or more devices to be controlled. As a result, it is necessary to provide some orderly method or apparatus for processing such communications. This is particularly true when the system is supervised by a computer.

2. Prior Art

Numerous types of multiplexer circuits have been proposed, heretofore, for providing communication between a control source and a plurality of controlled devices. However, none of the prior art multiplexing systems have been entirely satisfactory. Some of the prior art systems have processed communications sequentially, while other systems have handled communications on a "first come, first served" basis. Moreover, some systems have been extremely complex.

BRIEF SUMMARY AND OBJECTS OF INVENTION

These disadvantages of the prior art are overcome with the present invention and a multiplexing system is provided which can accommodate up to 256 transceivers. The multiplexer of the present invention also includes a control portion which controls data transfers, formats data, and generates and checks message check sum characters. At the same time, the multiplexer of the present invention is relatively simple and uncomplicated, is compact, and relatively inexpensive.

The advantages of the present invention are preferably attained by providing a multiplexer for interfacing between a computer and a plurality of transceivers, said multiplexer comrpising an input gate connected to receive data from said computer and from said transceivers, a pair of registers connected to receive data passed by said input gate, output gate means operable to pass signals from said registers to either said computer or said transceivers, check sum means for generating check sum characters for data passed by said input gate, comparator means for comparing the check sum generated by said check sum means with a transmitted check sum, decoder means connected to detect end-of-transmission signals passed by said input gate, and a control unit for controlling the operation of said multiplexer.

Accordingly, it is an object of the present invention to provide an improved multiplexer.

Another object of the present invention is to provide an improved multiplexer for interfacing between a computer and a plurality of transceivers.

A further object of the present invention is to provide a multiplexer which is relatively simple and uncomplicated, is compact and relatively inexpensive, yet can interface between a computer and up to 256 transceivers.

A specific object of the present invention is to provide a multiplexer for interfacing between a computer and a plurality of transceivers, said multiplexer comprising an input gate connected to receive data from said computer and from said transceivers, a pair of registers connected to receive data passed by said input gate, output gate means operable to pass signals from said registers to either said computer or said transceivers, check sum means for generating check sum characters for data passed by said input gate, comparator means for comparing the check sum generated by said check sum means with a transmitted check sum, decoder means connected to detect end-of-transmission signals passed by said input gate, and a control unit for controlling the operation of said multiplexer.

These and other objects and features of the present invention will be apparent from the following detailed description, taken with reference to the accompaying drawings.

DETAILED DESCRIPTION OF ILLUSTRATED EMBODIMENT

Figure 1:
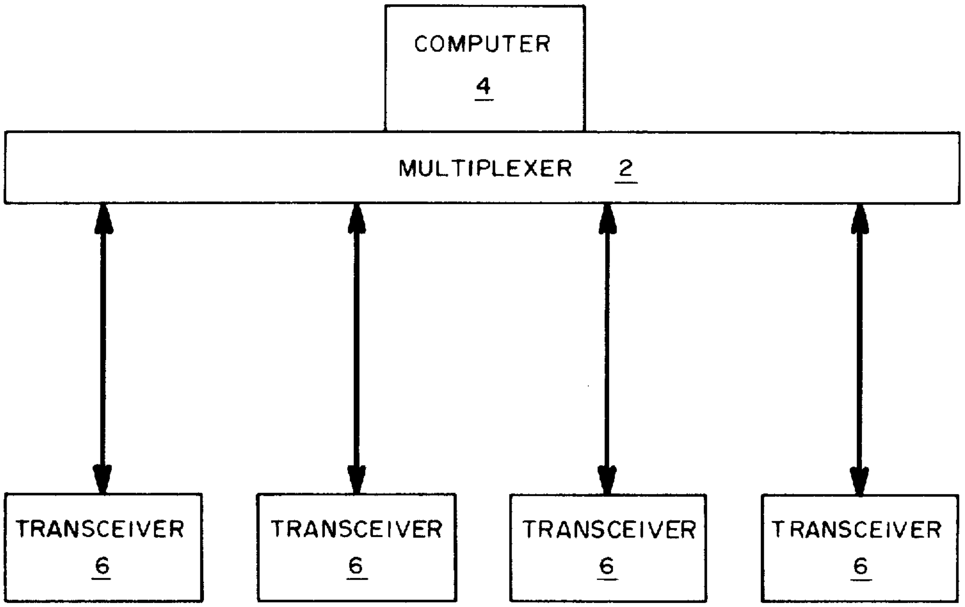
FIG. 1 is a diagrammatic representation of an automatic control system embodying the multiplexer of the present invention.

In that form of the present invention chosen for purposes of illustration, FIG. 1 shows an automatic control system comprising a multiplexer 2 interfacing between a computer 4 and a plurality of transceivers 6. The multiplexer 2 serves to provide orderly transfers of data between the computer 4 and the transceivers 6.

Figure 2:
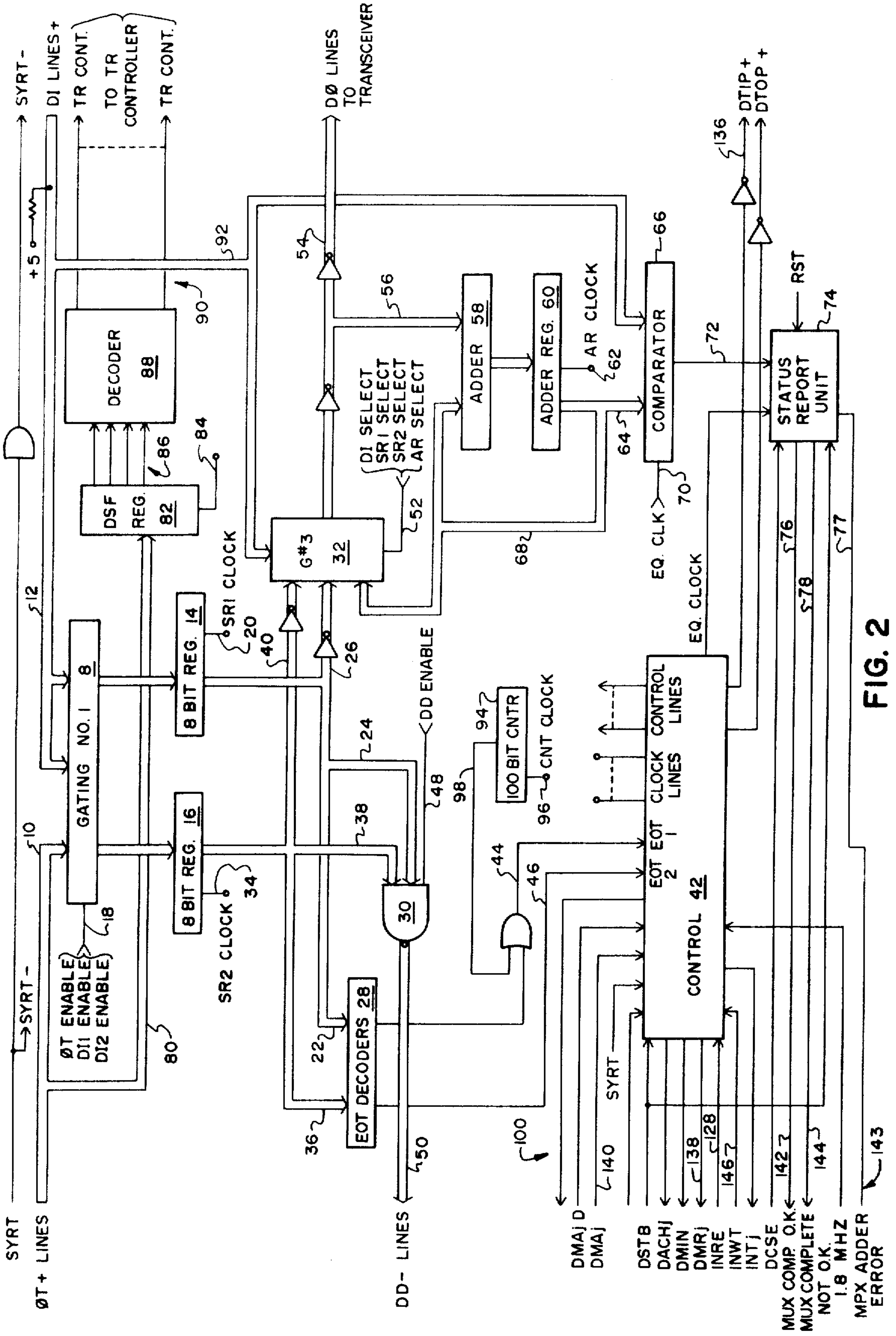
FIG. 2 is a diagrammatic representation of the multiplexer of FIG. 1.

FIG. 2 is a diagrammatic representation of the multiplexer 2. As shown, the multiplexer 2 comprises an input gate 8 which is connected to receive data from the computer 4 via input lines 10 and is connected to receive data from the transceivers 6 via input lines 12. A pair of eight bit registers 14 and 16 are connected to receive data signals passed by the input gate 8. Input gate 8 is triggered by any of three signals, "$\phi$T enable," "DI–1 enable" or "DI–2 enable", applied to input 18 of input gate 8. Register 14 receives clock pulses on input 20 and, when clocked, passes data contained therein via conductors 22, 24 and 26 to the end-of-transmission (EOT) decoder 28, output gate 30 and data gate 32. Similarly, register 16 receives clock pulses on input 34 and, when clocked, passes data contained therein via conductors 36, 38 and 40 to EOT decoder 28, output gate 30 and data gate 32. The EOT decoder 28 serves to recognize end-of-transmission signals and, when such a signal is received, passes a signal to the control unit 42 via conductors 44 or 46. Output gate 30 is triggered by a "DD enable" signal on input 48 and serves to pass data via conductor 50 to the computer 4. The data gate 32 is triggered by any of four signals, "DI select," "SR–1 select," "SR–2 select" or "AR select," applied to input 52. When triggered, the data gate 32 passes data signals via conductor 54 to the transceivers 6 and, also, applies the data via conductor 56 to an adder 58. Adder 58 adds each data word to any total contained in the adder register 60 and stores the resulting total in adder register 60. The adder register is clocked by an "AR clock" signal applied to input 62 and passes a signal, indicative of the total contained therein, via conductor 64 to comparator 66 and, also, applies this signal via conductor 68 to data gate 32 and adder 58 for purposes which will be described hereinafter. The comparator 66 is triggered by an "EQ clock" signal on input 70 and serves to pass a signal, indicating either equality or inequality, via conductor 72 to a status report unit 74 which applies a signal via either conductor 76, 77 or 78 which indicates to the computer 4 whether or not the data transfer has been successfully completed.

Data from the computer 4, applied via conductor 10 to input gate 8, is also applied via conductor 80 to a decode register 82 which receives a clock signal at input 84 and serves to decode the address of the particular one of the transceivers 6 to which the data transfer is directed and supplies the address signals via conductors 86, decoder 88, conductors 90 and a transceiver controller (not shown) to the appropriate one of the transceivers 6. Data from the transceivers 6, applied via conductor 12 to input gate 8, is also applied via conductor 92 to data gate 32 and comparator 66. Finally, a 100 bit counter 94 receives clock pulses via input 96 and, upon reaching 99, issues a signal via conductors 98 and 44 to the control unit 42 for purposes which will be explained subsequently. A plurality of conductors, indicated generally at 100, serve to pass signals between the computer 4 and the control unit 42 to control the operation of the multiplexer 2, as will be apparent hereinafter.

Figure 3:
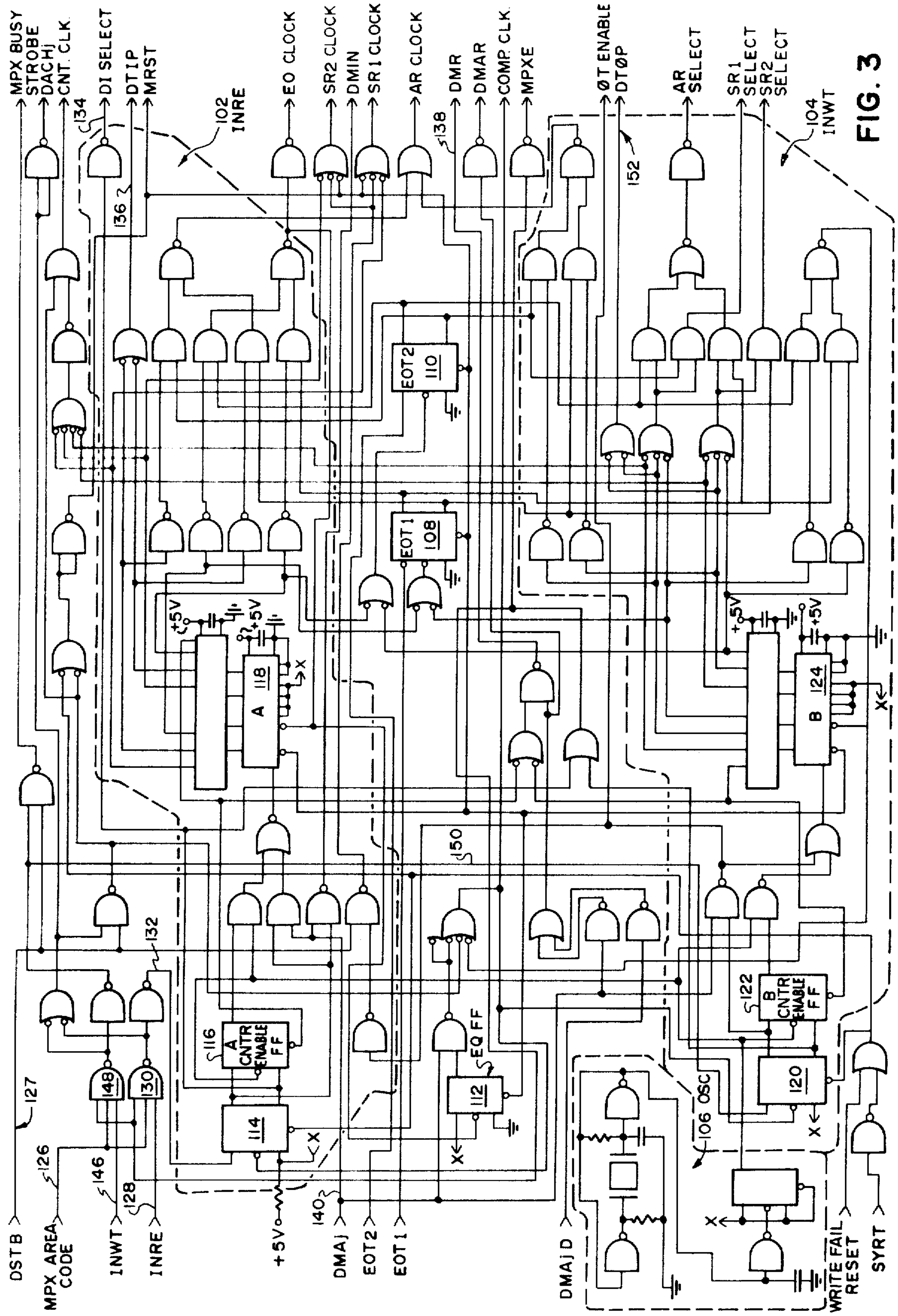
FIG. 3 is a circuit diagram of the control portion of the multiplexer of FIG. 2.

FIG. 3 is a circuit diagram of the control unit 42 of the multiplexer 2. Broadly, the control unit 42 comprises a "READ" portion, indicated generally at 102; a "WRITE" portion, indicated generally at 104; a master oscillator 106; an EOT–1 flip-flop 108; an EOT–2 flip-flop 110; and an equality flip-flop 112. The various inputs and outputs are designated by abbreviations of the signals which they carry. The meanings of the abbreviations will be apparent to those skilled in the art and the inputs and outputs and will be referred to by reference numbers only as needed to describe the operation of the multiplexer 2. The "READ" portion 102 includes a "START" flip-flop 114, a counter enable flip-flop 116, and a counter 118. Similarly, the "WRITE" portion 104 includes a "START" flip-flop 120, a counter enable flip-flop 122, and a counter 124. The counters 118 and 124 are decade counters which are clocked by pulses from the master oscillator 106 and which, at each position, energize respective conductors to control the operation of the multiplexer 2, as will be made apparent hereinafter.

In use, when one of the transceivers 6 has data to transmit to the computer 4, the transceiver 6 sends a "Data Ready" signal to the computer 4. Conventionally, this signal is sent through the computer interrupt circuitry, not shown, and does not go through the multiplexer 2. When the computer 4 is ready to receive the data, the computer applies a signal to inputs 126, 127 and 128 of the control portion 42 of the multiplexer 2 and to the decoder 88 to select the transceiver. The signal on input 126 is the multiplexer area code which determines which multiplexer will be actuated. The signal on input 128 is the "Initiate Read" command. As seen in FIG. 3, these signals are passed by AND gate 130 and conductor 132 to enable the "START" flip-flop 114 of the "READ" portion 102 of the control portion 42 of multiplexer 2. The signal on input 127 triggers the "START" flip-flop 114. Triggering of "START" flip-flop 114 serves to trigger the counter enable flip-flop 116 which, then, passes clock pulses from oscillator 106 to decade counter 118 and 100 bit counter 94. At the same time, the signal on input 127 passes signals to reset adder register 60 of FIG. 2 to zero, resets the EOT flip-flops 108 and 110. The flip-flop 116 issues a "DI select" signal on output 134 to enable data from the selected transceiver 6 which is ready to transmit data. The first clock pulse passed to counter 118 arms the input gate 8 to receive data from the transceivers. On the second clock pulse passed to counter 118, the counter applies a signal to "DTIP" output 136 which causes the appropriate transceiver to apply its data to inputs 12 and 92 of the multiplexer 2. On the second clock pulse, counter 118 clocks register 14, adder gate 32 and adder 58 to cause adder 58 to insert the first data word into adder register 60. On the third clock pulse, the EOT 2 flip-flop 110 is clocked but EOT has not been decoded yet. The next two clock pulses to counter 118 serve to deenergize register 14 and energize register 16. The sixth clock pulse passed to counter 118, the counter applies a signal to "DTIP" output 136 which causes the appropriate transceiver to apply its data to inputs 12 and 92 of the multiplexer 2. The sixth clock pulse to counter 118 is applied to clock register 16 to pass the second data word to adder 58. Adder 58 adds the second data word to the first and stores the total in adder register 60. On the seventh clock pulse, the EOT 1 flip-flop 108 is clocked, but EOT has not been decoded yet. The next three clock pulses to counter 118 serve to deenergize register 16. This temporarily blocks passage of further clock pulses from oscillator 106 to counter 118 and issues a "Direct Memory Request" (DMR;) signal to the computer 4 on output 138. When the computer 4 is ready to accept data into its memory, the computer 4 issues a "Direct Memory Access" (DMA;) signal to control unit 42 on input 140. This signal serves to inhibit the DMR; signal, reset the A counter flip-flop 116 to renew passage of clock pulses from oscillator 106 to counter 118, and energizes output gate 30 to pass the first data word via conductor 50 to the computer 4. Since the EOT signal has not been received, resets the system to receive additional data. This action is repeated until the transceiver has completed its data transfer, whereupon the transceiver issues an EOT signal followed by a check sum character which is the total of all of the transmitted data. The data words passed by registers 14 and 16 are also applied to EOT decoder 28 and, when the EOT signal is detected, the EOT decoder sets the appropriate one of the EOT flip-flops 108 and 110. This causes the check sum, transmitted by the transceiver via conductor 92, to be loaded into the comparator 66 and to set EQ flip-flop 112. Comparator 66 compares this value with the total acquired by adder register 60 and issues a signal via conductor 72 to cause the status report unit to apply a signal to the computer 4 via either output 142, 143 or 144 to indicate that the data transfer is complete and is or is not correct. Finally, setting of the EQ flip-flop 112 serves to reset the multiplexer for a new operation.

When the computer 4 desires to transmit data to one of the transceivers 6 it issues a data word via conductor 80 to decode register 82 containing the address of the transceiver with which the computer desires to communicate; applies a signal containing the multiplexer area code signal on input 126 and applies an "Initialize Write" signal to input 146. These signals are passed by AND gate 148 and conductor 150 to enable "START" flip-flop 120 of the "WRITE" portion 104 of the control unit 42 of multiplexer 2. The signal on 127 is issued and triggers "START" flip-flop 120. Triggering of "START" flip-flop 120 serves to trigger counter enable flip-flop 122 which, then, passes clock pulses from oscillator 106 to decade counter 124. At the same time, the signal on 127 passes signals to reset the adder register 60 to zero, reset the EOT flip-flops 108 and 110, and trigger decode register 82 to pass the address signal from computer 4 through decoder 88 to prepare the designated one of the transceivers 6 to receive data. If the designated transceiver is busy at this time, it issues a "transceiver busy" signal through the interrupt circuitry, not shown, of the computer 4 which, in turn, issues "WRITE FAIL RESET" signal to reset the multiplexer 2 for a new operation. If the designated transceiver is ready to receive data, no such signal is issued. Thus, upon passage of the first clock pulse from oscillator 106 to counter 124, the counter applies a "Direct Memory Request" signal to the computer 4 via output 138 and resets counter enable flip-flop 122 to block passage of further clock pulses from oscillator 106 to counter 124. Subsequently, when the computer 4 is ready to transmit the data, the computer 4 applies the data via conductor 10 to input gate 8 and issues a "Direct Memory Access" signal on input 140 which triggers counter enable flip-flop 122 to again permit clock pulses to flow to counter 124 and triggers input gate 8 to pass the first two data words into registers 14 and 16, respectively. Upon passage of the next clock pulse, the counter 124 triggers adder gate 32 and adder 58 to cause the first data word to be inserted in the adder register 60 and to be passed via output 54 to the appropriate transceiver. On the third clock pulse, counter 124 applies a signal via conductor 152 to cause the transceiver to accept the first data word. On the next two clock pulses, counter 124 deenergizes register 14. On the sixth clock pulse, counter 124 triggers adder gate 32 and adder 58 to cause the second data word to be passed via output 54 to the transceiver and to be added to the total stored in adder register 60. On the seventh clock pulse, counter 124 causes the new total to be stored in the adder register 60 and, again, issues a signal on output 152 to cause the transceiver to accept the second data word. The next three clock pulses cause counter 124 to deenergize register 16 and reset the multiplexer 2 to accept additional data. This action is repeated until the desired data has been transferred, whereupon the computer 4 transmits an EOT data word. When the EOT signal is sensed by the EOT decoder 28, the decoder 28 passes a signal which sets EOT flip-flops 108 and 110, triggers adder register 60 to insert its acquired total to output lines 54 to the transceiver via conductor 68 and gates 32, and arms the system to stop. The status report unit 74 applies a signal on either conductor 76 or 78 to advise the computer 4 whether or not the data transfer has been correctly completed. Thereafter, the multiplexer 2 is reset to await a new operation.

The 100 bit counter 94 is set to one at the start of each data transfer operation and is clocked each time a data word is passed. Normally, data transfers will involve less than a hundred data words and the operation will be terminated upon sensing of the EOT word. However, in the event that the EOT word is improperly transmitted or omitted, the system will continue to operate until counter 94 has acquired a full count, whereupon, counter 94 issues a signal via conductor 44 to trip the EOT flip-flop 108 and halt the operation. This serves to prevent "runaway" operation of the multiplexer 2.

Obviously, numerous variations and modifications may be made without departing from the present invention. Accordingly, it should be clearly understood that the form of the present invention described above and shown in the accompanying drawings is illustrative only and is not intended to limit the scope of the invention.

What is claimed is:

1. A multiplexer for interfacing between a computer and a plurality of transceivers to provide orderly transfer of data therebetween, said multiplexer comprising:
   - control means for controlling the operation of said mutliplexer by predetermined control signals and clock pulses,
   - an input gate connected to receive data from said computer and from said transceiver upon receipt of said predetermined control signals from said control means,
   - register means connected to receive data from said input gate, said register means outputting said received data upon receipt of said clock pulses from said control means,
   - output gate means operable to receive the output signals from said register means, said output gate means passing data to said computer and said transceivers upon receipt of said predetermined control signals from said control means, and
   - check means for comparing a sum indicative of data passed by said output gate means with a sum indicative of the data received by said input gate to determine whether each data transfer is correct.

2. The device of claim 1 wherein said output gate means comprises:
   - a first output gate connected to receive signals from said register means and operable to pass said signals to said computer, and
   - a second output gate connected to receive signals from said register means and operable to pass said signals to said transceivers and to said check means, and
   - said check means including an adding means connected to said second output gate to add said data passed to said transceivers to provide said sum indicative of data passed by said output gate thereby.

3. The device of claim 1 wherein said control means comprises:
   - a "READ" portion operable to control said multiplexer to transfer data from said transceivers to said computer,
   - a "WRITE" portion operable to control said multiplexer to transfer data from said computer to said transceivers,
   - each of said portions including a "START" flip-flop, a counter enable flip-flop, and a decade counter,
   - a master oscillator connectable through each of said counter enable flip-flops to clock the appropriate one of said decade counters,
   - means responsive to command signals from said computer for triggering an appropriate one of said portions, and
   - means connected to each position of said counters for passing signals to control the actuation of said input gate, said register means, said output gate, and said check means.

4. The device of claim 1 further comprising:

decode means connected to detect passage by said input gate of an end-of-transmission signal and operable to indicate such passage to said control unit, and reset means in said control unit responsive to detection of said end-of-transmission signal to reset said mutliplexer for another operation.

5. The device of claim 3 further comprising:

a fixed length counter connected to be clocked by said master oscillator and operative upon acquiring a full count to cause said control unit to reset said multiplexer for another operation.

6. A control unit for controlling a multiplexer having gating means for gating passage of data including end of transmission and check sum data between a computer and a plurality of transceivers and having check means for comparing inputted data with passed data, said control unit comprising:

a first decade counter, means connected to each position of said first decade counter operable upon clocking of said first counter to cause said gating means to transfer data from said computer to said transceivers, a second decade counter, means connected to each positon of said second counter and operable upon clocking of said second counter to cause said gating means to transfer data from said transceiver to said computer, a master oscillator connectable to clock said counters, coupling means responsive to command signals from said computer for coupling said oscillator to clock an appropriate one of said counters, and end of transmission flip-flop means actuated by said end of transmission data to pass said check sum data to said check means.

7. The device of claim 2 including:

a decoder connected between said computer and said control means to detect said sum indicative of the data received by said input gate and signal said control means upon detecting said sum, said control means providing a signal to said check means upon receiving said sum detecting signal from said decoder to compare said sum indicative of data passed with said sum indicative of data received.

* * * * *